June 17, 1924.
F. A. JIMERSON
CONNECTING ROD BEARING
Filed Sept. 17, 1923
1,498,170
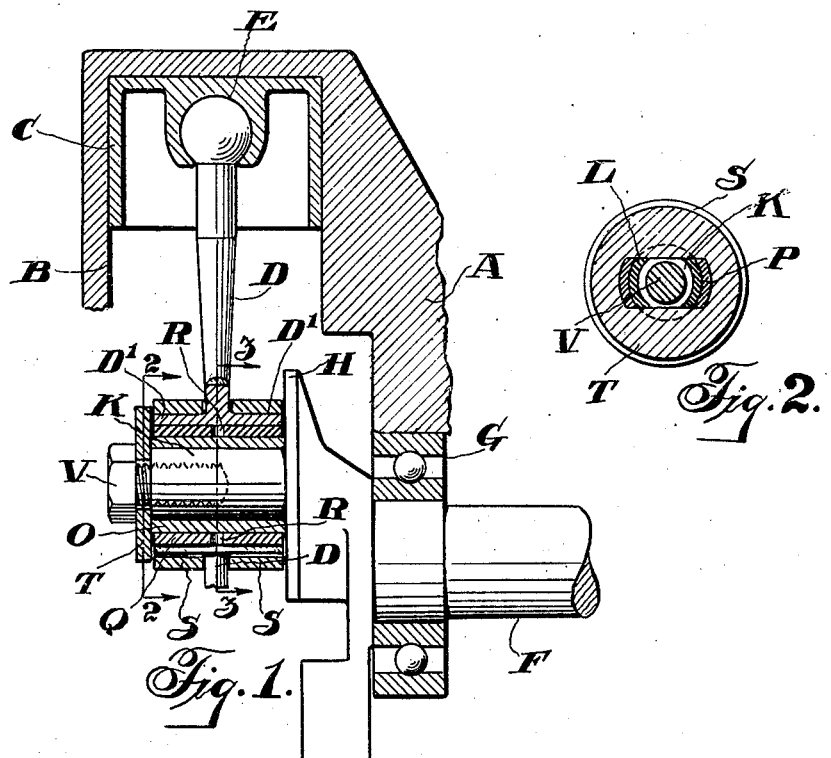
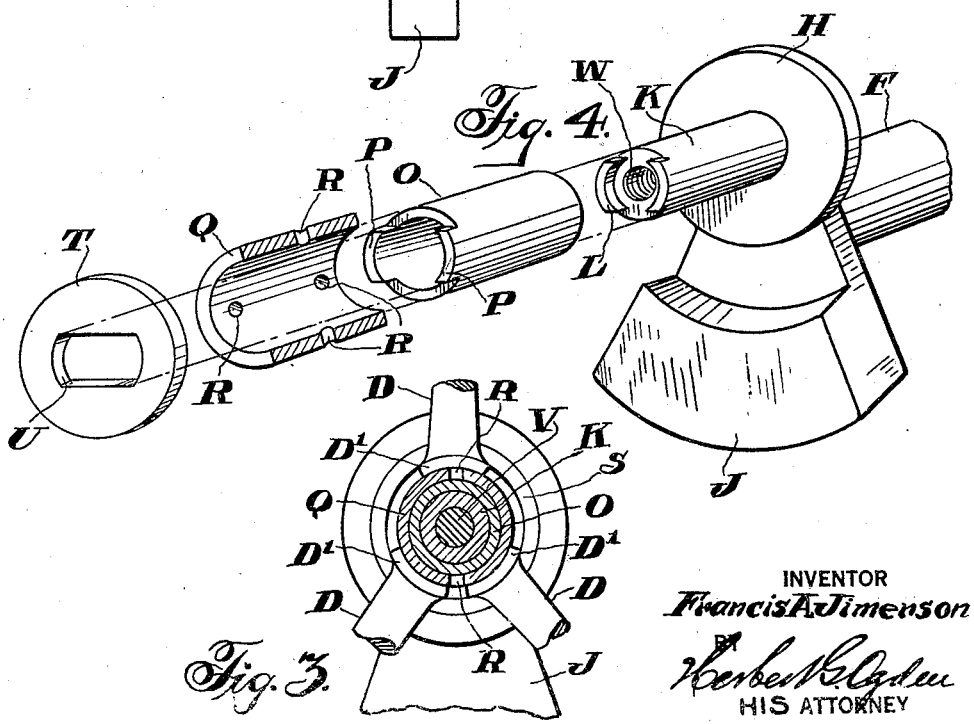
INVENTOR
Francis A. Jimerson
Herbert C. Ogden
HIS ATTORNEY Patented June 17, 1924.

1,498,170

UNITED STATES PATENT OFFICE.

FRANCIS A. JIMERSON, OF ATHENS, PENNSYLVANIA, ASSIGNOR TO INGERSOLL-RAND COMPANY, OF JERSEY CITY, NEW JERSEY, A CORPORATION OF NEW JERSEY.

CONNECTING-ROD BEARING.

Application filed September 17, 1923. Serial No. 663,063.

*To all whom it may concern:*

Be it known that I, FRANCIS A. JIMERSON, a citizen of the United States, and a resident of Athens, county of Bradford, State of Pennsylvania, have invented a certain Connecting-Rod Bearing, of which the following is a specification accompanied by drawings.

This invention relates to fluid actuated tools, which may be rotary tools such as grinders, drills, and the like, operated by a motor, provided with a plurality of radially arranged cylinders having pistons connected to a crank pin on a longitudinally extending crank for imparting rotation to the drill, emery wheel, or other operative parts to be actuated.

Fluid actuated rotary motors for pneumatic tools are designed to be operated at high speeds, and it is desirable that the connecting rod bearings on the crank pin receive adequate lubrication at all times, and furthermore that the bearing surface for the connecting rods be readily replaceable when wear occurs.

One object of the present invention is to enable at least one connecting rod or a plurality of connecting rods mounted on a common crank pin to receive adequate lubrication. Another object of the invention is to introduce a member which forms part of the connecting rod bearing but may be readily and conveniently replaced as wear occurs and at the same time serves to distribute lubricant over the bearing surfaces.

Further objects of the invention will hereinafter appear, and the invention is shown in one of its preferred forms in the accompanying drawings, in which—

Figure 1 is a longitudinal sectional view through a portion of the casing of a fluid actuated rotary drill, showing the crank shaft and operatively connected parts.

Figure 2 is a detail transverse sectional view taken on the line 2—2 of Figure 1, looking in the direction of the arrows;

Figure 3 is a detail transverse sectional view taken on the line 3—3 of Figure 1 looking in the direction of the arrows, and Figure 4 is a perspective view of the crank shaft and associated elements showing the method of assembly.

Referring to the drawings, A designates a portion of the cylinder casing B, in which the piston C is adapted to reciprocate, there usually being three such cylinders in the rotary drill illustrated, although one is deemed sufficient for illustrative purposes. The connecting rod D is formed with the bearing flanges D', and in this instance is connected to a piston C by a ball and socket joint E and there are three such connecting rods, as shown in Figure 3, adapted to be connected to the corresponding pistons.

A crank shaft F is mounted in the ball bearing G in the casing A, and is provided with a crank disc H, counterweight J, and crank pin or wrist K, which is preferably formed with fastening means shown as a pair of longitudinally extending lugs or projections L. A crank pin sleeve O adapted to be mounted on the crank pin K is formed with means for preventing rotation relatively to the crank pin, shown as longitudinally extending lugs or projections P adapted to cooperate with the lugs L on the crank pin.

In accordance with the present invention, a connecting rod bushing Q is loose upon the sleeve O and is preferably formed with a series of holes R forming pockets for the distribution of lubricant over the connecting rod bearing surfaces and this bushing Q is inserted over the sleeve O so that it lies beneath the flanges D' of the connecting rod. Wear which would ordinarily occur on the crank pin K will be taken up by sleeve O, which is non-rotatable with respect to the pin K and replaceable, and also taken up by the rotatable and replaceable bushing Q. The connecting rods are retained on the bushing Q by the rings S, one of which is located on each flange D'. A washer T, having an oblong hole U, is adapted to fit over the lugs L of the crank pin K and the lugs P of the sleeve O which extend beyond the replaceable bushing Q, so that the sleeve is held from rotation relatively to the crank pin. A screw V is adapted to be threaded into the hole W in the crank pin K for holding the washer in place on the crank pin and for locking the assembled parts together.

As the crank is rotated, the connecting rod flanges D' and the replaceable bushing Q have relative movement and lubricant in the casing will enter the pockets R of the bushing Q and in this manner the connecting rod flanges, as well as the sleeve O, will at all times receive adequate lubrication. When wear occurs on the sleeve O, a new sleeve may be readily applied to the crank pin K, and this is a great advantage due to the cheapness of the sleeve and the higher cost of the crank shaft F, of which crank pin K is an integral part.

I claim:

1. In a fluid actuated tool, the combination with a crank pin, of at least one connecting rod mounted on the crank pin, longitudinally extending lugs on said crank pin, a non-rotatable crank pin sleeve, longitudinally extending lugs on said sleeve, a connecting rod bushing on said sleeve, rings adapted to retain the connecting rod on the bushing, a washer fitting over the lugs on the crank pin and sleeve and means for holding the washer in place on the crank pin.

2. In a fluid actuated tool, the combination with a crank pin, of at least one connecting rod mounted on the crank pin, longitudinally extending lugs on said crank pin, a non-rotatable crank pin sleeve, longitudinally extending lugs on said sleeve, a connecting rod bushing on said sleeve, pockets in said bushing adapted to distribute lubricant to the connecting rod bearing and to said sleeve, rings adapted to retain the connecting rod on the bushing, a washer fitting over the lugs on the crank pin and sleeve, and a screw for holding the washer in place on the crank pin.

In testimony whereof I have signed this specification.

FRANCIS A. JIMERSON.